United States Patent [19]

Puente

[11] Patent Number: 5,322,252
[45] Date of Patent: Jun. 21, 1994

[54] PIVOTING MOUNTING FOR AN OPTICAL ELEMENT OF A MOTOR VEHICLE HEADLAMP

[75] Inventor: Jean-Claude Puente, Livry Gargan, France

[73] Assignee: Valeo Vision, France

[21] Appl. No.: 855,069

[22] Filed: Mar. 23, 1992

[30] Foreign Application Priority Data

Mar. 29, 1991 [FR] France .................................. 91 03841

[51] Int. Cl.⁵ .............................................. F21V 21/00
[52] U.S. Cl. ................................ 248/221.4; 248/288.5; 248/231.9; 362/421
[58] Field of Search ................ 248/221.4, 222.1, 223.1, 248/223.3, 224.4, 231.9, 229, 314, 316.1, 316.5, 288.3, 288.5; 362/371, 374, 421

[56] References Cited

U.S. PATENT DOCUMENTS

| | | | |
|---|---|---|---|
| 290,103 | 12/1883 | Paul | 248/288.5 X |
| 541,863 | 7/1895 | Loomis | 248/288.5 X |
| 587,912 | 8/1897 | Atwood | 248/288.5 X |
| 1,412,253 | 4/1922 | Mercer | 248/221.4 X |
| 1,573,272 | 2/1926 | Phillips | 248/288.5 X |
| 2,248,170 | 7/1941 | Hansen | 248/229 |
| 3,182,329 | 5/1965 | Biesecker | 248/288.3 X |
| 3,588,018 | 6/1971 | Harlow | 248/221.4 |
| 3,890,459 | 6/1975 | Caveney | 248/221.4 X |
| 4,515,336 | 5/1985 | Fischer | 248/288.3 |
| 4,689,725 | 8/1987 | Saijo et al. | |
| 4,913,392 | 4/1990 | Swartzendruber et al. | 248/231.9 |
| 4,974,123 | 11/1990 | Luallin et al. | |

FOREIGN PATENT DOCUMENTS

| | | | |
|---|---|---|---|
| 1595740 | 6/1970 | France. | |
| 2604341 | 5/1988 | France | B60Q 1/06 |
| 2233754 | 1/1991 | United Kingdom | B60Q 1/06 |

Primary Examiner—David A. Scherbel
Assistant Examiner—Korie Chan
Attorney, Agent, or Firm—Morgan & Finnegan

[57] ABSTRACT

In a pivoting mounting for an optical element of a motor vehicle headlamp, of the kind comprising a seating in which a ball head at the end of a retaining and/or adjusting bar or screw for the headlamp is received, the seating is defined by two cup elements shaped as half shells and together defining a substantially spherical cavity. This cavity is open to the outside through a flared aperture in the front face of the cup elements. The two cup elements are hinged together so as to open and close the cavity, and are provided with a snap-fitting device comprising, on one of the cup elements, a projecting tab having a finger pad and a locking shoulder for cooperation with a further locking shoulder formed on the other cup element. The rear of one of the cup elements is joined to a base member having a rear face from which snap-fitting means, in the form of mutually overlying pairs of snap catches, are carried. These catches engage in snap-fitting relationship against retaining shoulders formed around a mounting hole in a headlamp element, against which the rear face of the base member abuts when fitted.

19 Claims, 1 Drawing Sheet

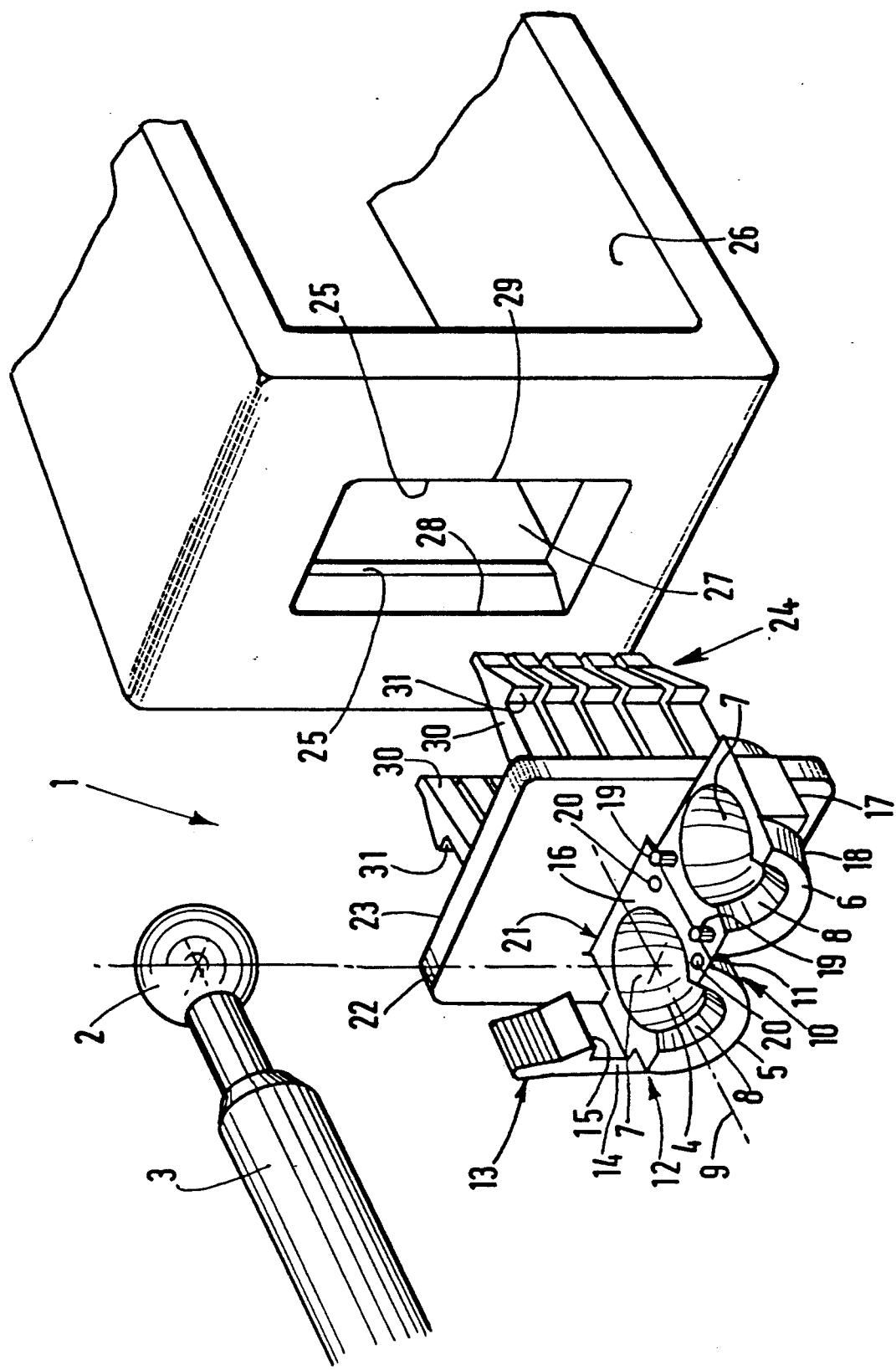

PIVOTING MOUNTING FOR AN OPTICAL ELEMENT OF A MOTOR VEHICLE HEADLAMP

FIELD OF THE INVENTION

This invention relates to a pivoting mounting for an optical element of a headlamp for a motor vehicle, of the kind comprising a portion or seating which is adapted to receive and to retain in pivoting relationship a ball head forming the outer end of a bar or screw for fastening and/or adjusting the said headlamp.

BACKGROUND OF THE INVENTION

In order to facilitate fitting of the ball head in its seating, it has previously been proposed to form the latter in two removable parts. That is for example so in the arrangements disclosed in the specifications of French published patent applications Nos. FR 1 595 740A and FR 2 606 341A. In accordance with the first mentioned of these two specifications, the ball head seating comprises two half shell elements which are separate and which are arranged to receive and then, after being fitted together, to hold a ball head in position, the whole being locked by means of an external gripping ring which surrounds the two half shell elements.

The arrangement described in FR 2 606 341A is of substantially the same type, except that the two half shells form an external screw with which a nut is arranged to cooperate, so as to hold it in position and also for unlocking purposes.

DISCUSSION OF THE INVENTION

An object of the present invention is to simplify the arrangements described above.

According to the invention, a pivoting mounting for an optical element of a vehicle projector comprises a ball head seating formed from two cup elements, which are formed as half shells and which together define within them a substantially spherical cavity which is open to the outside through a flared aperture, is characterised in that one of the said cup elements, i.e. a first cup element, has, projecting from a first side edge on a first side of the first cup element substantially parallel to the axis along which the said flared aperture is open to the outside, articulating means articulating the first cup element to the other cup element, i.e. the second cup element, and, fixed to a second side edge on a second side of the first cup element parallel and opposed to its said first side, snap-closing means which are adapted to cooperate with a locking shoulder formed laterally on the said second cup element opposite to the side of the latter on which the latter is articulated to the said first cup element.

In this way, the pair of half shells or cup elements, together with means for locking them together, may be made as a single component by moulding in plastics material, which represents a substantial economy in terms of selling price of the device as a whole, and which above all enables a ball head to be mounted in a ball head seating more easily and more quickly.

According to a preferred feature of the invention one of the said cup elements, and preferably the said first cup element, is fixed through one of its faces, namely a rear face opposed to the face through which the said flared orifice is open, to a base plate which includes, on the opposite side of the latter from the said first cup element, snap-fitting means adapted to cooperate with at least one retaining shoulder, which is formed on a headlamp element and defined around a mounting window.

Preferably, the said snap-fitting means comprise at least one pair of resilient snap catches laterally opposed to each other, which cooperate with two shoulders formed on either side of the mounting window of the headlamp element, with the said base member being adapted to abut on the said headlamp element.

There is preferably a plurality of the said pairs of resilient catches, arranged in overlying relationship with each other. Preferably again, the overall height of the totality of pairs of resilient catches in overlying relationship is less than the height of the said mounting window, so that the said mounting can be displaced in the direction corresponding to the said heights by sliding of the base member on the headlamp element.

These arrangements provide one additional degree of freedom which facilitates the adjustment of the headlamp.

A preferred embodiment of the invention will be described below, by way of example only and with reference to the accompanying drawing.

BRIEF DESCRIPTION OF THE DRAWING

The single FIGURE of the drawing is a perspective view of a pivoting headlamp mounting for a motor vehicle.

DESCRIPTION OF A PREFERRED EMBODIMENT OF THE INVENTION

The pivoting headlamp mounting 1 is adapted to receive the head 2, in the form of a ball, of a bar or screw 3 for the fastening and/or the position adjustment of an optical element of a headlamp which is not shown. Such an optical element may consist of a reflector of an elongate optical element also having the headlamp, the position of which is made to be adjustable with respect to a body of the headlamp. Alternatively it may be a reflector unit closed by a transparent glass, which is mounted for adjustment as to its position with respect to a support for fastening the reflector unit. For more details in this regard, reference is invited by way of example to the French specification No. FR 2 606 341A mentioned above.

A ball seating 4 is formed from two half shell or cup elements, namely a first cup element 5 and a second cup element 6, which together define a substantially spherical cavity 7 for receiving the ball head 2 with a slight clearance. The cavity 7 is open to the outside through a flared aperture 8 having an axis 9, which increases in width towards the outside and which enables the bar 3 to be adjusted as to its inclination by rotation about the centre of the cavity 7.

The first cup element 5 has articulating means articulating it to the second cup element 6, these articulating means projecting from a first side edge 10 corresponding to a first side which is substantially parallel to the axis 9. In practice and as shown, these articulating means comprise a film hinge 11 which extend along at least part of the said first side edge 10, and preferably over the major part of the latter. The second cup element 6 is thus able to pivot about the film hinge 11 so as to enclose the ball head 2 within the cavity 7, or to release it from the cavity.

Snap closing means 13 are provided, being fixed to a second side edge 12 opposite to the first side edge 10.

The snap closing means or element 13 include a resilient tab 14 projecting from the second side face 12, and directed towards the second cup element 6 when the latter is closed over the first cup element 5. A snap catch is constituted by a shoulder 15 which is formed towards the end of the resilient tab 14 and parallel to the junction plane 16 between the two cup elements 5 and 6. The upper portion 18 of the second cup element 6 carries a locking shoulder 17 for cooperation with the shoulder 15 of the snap catch.

A finger pad is incorporated at the end of the resilient tab 14, to enable the snap catch having the shoulder 15 to be operated so as to open the ball head seating.

At least one centering pin 19 is provided on one of the cup elements (in the drawing, the second cup element 6), for cooperation with a centering hole 20 which is formed correspondingly on the other cup element, 5 in this example. As shown, there are two centering pins 19 and two corresponding centering holes 20. Centering pins 19 and centering holes 20 are disposed symmetrically about the film hinge 11.

One of the cup elements 5, 6, and preferably (and as shown) the first cup element 5, is made fixed with respect to a base member 22. The cup element 5 is joined to the base member 22 through one of its faces, namely its rear face 21 opposite to the front face which contains the flared aperture 8. The base member 22 includes mounting means comprising a snap-fitting means 24 projecting from its rear or abutment face 23, which is an abutment face on the side of the base member 22 opposite to that at which the cup elements 5 and 6 are mounted. The snap-fit means are arranged to cooperate with at least one retaining shoulder 25 formed on a headlamp element 26 around a mounting window 27. In practice and as shown, there are two retaining shoulders 25 formed along the two opposed edges 28 and 29 of the mounting window 27.

The snap-fitting means 24 comprise at least one pair of resilient catches 30, which have a snap-fitting action by virtue of a snap-fitting shoulder 31 which extends laterally outwardly on each catch 30. The catches 30 of any one pair are spaced apart from each other by a distance slightly smaller than the width of the mounting window 27, between the two opposed edges 28 and 29 of the latter. The lateral width of the snap-fit shoulders 31 is such that the distance between the shoulders of the two catches in any one pair is greater than the width of the mounting window 27, so that the snap-fit shoulders can cooperate with the headlamp element 26.

The distance between the snap-fit shoulders 31 and the base member 22 is slightly greater than the thickness of the mounting window 27, in such a way as to enable the base member 22 to come into contact with the headlamp element 26, with the snap-fit shoulders 31 then engaging behind the retaining shoulders 25. There are, in this example, a plurality of pairs of resilient snap-fitting catches 30, overlying each other as shown. Also as shown, the overall height of the whole snap-fitting means 24, comprising (here) five pairs of catches 30, is less than the height of the mounting window 27, so that the pivoting headlamp mounting 1 can be displaced up and down as a unit, by sliding movement of the base member 22 on the headlamp element 26.

In this way, a monobloc unit is provided which may be moulded in synthetic plastics material and which facilitates fitting and removal, while at the same time ensuring that the ball head 2 is firmly retained.

It will be realised that the arrangement described above enables the position of the ball head 2 to be adjusted and varied if necessary with respect to the headlamp element 26.

What is claimed is:

1. A single component plastic moulded pivoting mounting for an optical element of a vehicle headlamp for attachment to a headlamp element surface, the optical element including an elongate member having a ball shaped head, said pivoting mounting having;
   a pair of cup elements in the form of half shells, together defining a substantially spherical cavity and constituting a ball head seating, said ball head seating being formed with a flared aperture through which said cavity is open to the outside and which defines an axis, the elongate member extending through the flared aperture with the ball-shaped head received in said ball head seating, said flared aperture enabling the inclination of the elongate member with respect to said cavity axis to be adjusted by rotation of the elongate member relative thereto, a first one of said cup elements having a first side edge and a second side edge spaced from said first side edge, the second cup element having a third side edge adjacent to and parallel with said first side edge and a fourth side edge spaced from said third side edge;
   articulating means connecting and articulating the two cup elements together along the first side edge of the first cup element and the third side edge of the second cup element; and
   means defining a first locking shoulder projecting outwardly from a side of the second cup element containing said fourth side edge wherein the pivoting mounting further comprising;
   a snap closing element protruding from said second side edge of the first cup element for cooperation with said first locking shoulder to hold said cup elements together; and
   a mounting means formed as a part of the single component plastic moulding attached to at least one of said cup elements enabling attachment of the pivoting mounting to the headlamp element surface to permit articulation of said pair of cup elements when the pivoting mounting is attached to the headlamp element.

2. A mounting according to claim 1, wherein said articulating means comprises a one-piece film hinge extending along at least part of said first and third side edges, said film hinge being integral with said first and third side edges.

3. A single component plastic moulded pivoting mounting for an optical element of a vehicle headlamp for attachment to a headlamp element surface, the optical element including an elongate member having a ball shaped head, said pivoting mounting comprising:
   a pair of cup elements in the form of half shells, together defining a substantially spherical cavity and constituting a ball head seating, said ball head seating being formed with a flared aperture through which said cavity is open to the outside and which defines an axis, the elongate member extending through the flared aperture with the ball-shaped head received in said ball head seating, said flared aperture enabling the inclination of the elongate member with respect to said cavity axis to be adjusted by rotation of the elongate member relative thereto, a first one of said cup elements having a first side edge and a second side edge spaced from said first side edge, the second cup element having a third side edge adjacent to and parallel with said first side edge and a fourth side edge spaced from said third side edge;

articulating means articulating the two cup elements together along the first side edge of the first cup element and the third side edge of the second cup element;

means defining a first locking shoulder on the side of the second cup element on said fourth side edge;

a snap closing element protruding from said second side edge of the first cup element for cooperation with said first locking shoulder to hold said cup elements together;

a mounting means attached to at least one of said cup elements enabling attachment of the pivoting mounting to the headlamp element surface to permit articulation of said pair of cup elements when the pivoting mounting is attached to the headlamp element;

wherein that said closing element is a resilient tab projecting from said second side edge of the first cup element and defining a second locking shoulder toward its free end, for cooperation of said second locking shoulder with said first locking shoulder.

4. A mounting according to claim 3, wherein said resilient tab includes a finger pad.

5. A mounting according to claim 1, further including a centering pin on one of said cup elements and a centering hole formed in a corresponding position on the other cup element for cooperation with said centering pin.

6. A mounting according to claim 5, wherein said centering pin and centering hole are arranged symmetrically about said film hinge.

7. A mounting according to claim 1 wherein one said cup element, having a face through which said flared aperture is formed, has another face opposite to said aperture face, a base member attached to said another face, the base member having an abutment face on the side thereof opposite to said cup members, and the mounting further including snap-fitting means protruding from the abutment face of the base member, and a headlamp element defining a mounting window which itself defines a retaining shoulder for cooperation with the snap-fitting means.

8. A single component plastic moulded pivoting mounting for an optical element of a vehicle headlamp for attachment to a headlamp element surface, the optical element including an elongate member having a ball shaped head, said pivoting mounting comprising:

a pair of cup elements in the form of half shells, together defining a substantially spherical cavity and constituting a ball head seating, said ball head seating being formed with a flared aperture through which said cavity is open to the outside and which defines an axis, the elongate member extending through the flared aperture with the ball-shaped head received in said ball head seating, said flared aperture enabling the inclination of the elongate member with respect to said cavity axis to be adjusted by rotation of the elongate member relative thereto, a first one of said cup elements having a first side edge and a second side edge spaced from said first side edge, the second cup element having a third side edge adjacent to and parallel with said first side edge and a fourth side edge spaced from said third side edge;

articulating means articulating the two cup elements together along the first side edge of the first cup element and the third side edge of the second cup element;

means defining a first locking shoulder on the side of the second cup element on said fourth side edge;

a snap closing element protruding from said second side edge of the first cup element for cooperation with said first locking shoulder to hold said cup elements together;

a mounting means attached to at least one of said cup elements enabling attachment of the pivoting mounting to the headlamp element surface to permit articulation of said pair of cup elements when the pivoting mounting is attached to the headlamp element; one said cup element, having a face through which said flared aperture is formed, has another face opposite to said aperture face, a base member attached to said another face, the base member having abutment face on the side thereof opposite to said cup members, and the mounting further including snap-fitting means protruding from the abutment face of the base member, and a headlamp element defining a mounting window which itself defines a retaining shoulder for cooperation with the snap-fitting means; and said snap-fitting means having at least one pair of resilient snap-fit catches, each having a snap-fit shoulder extending laterally outwardly relative to the axis.

9. A mounting according to claim 8, wherein each snap-fit catch includes an arm between said shoulder and abutment face wherein each pair of side-by-side arms are laterally spaced apart by a distance slightly smaller than the width of the mounting window measured between its opposed edges, the totality of the snap-fitting means comprising the pairs of catches having an overall lateral width such that the distance between the shoulders of any one pair of catches is greater than the width of the mounting window, whereby to permit cooperation with said retaining shoulders.

10. A mounting according to claim 8, having a plurality of said pairs of catches in overlying relationship with each other and defining an overall height smaller than the corresponding height of the mounting window.

11. A pivoting mounting for attachment to a headlamp element surface and for pivotally supporting an elongate optical element of a vehicle headlamp, an end of the optical element having the shape of a ball, said pivoting mounting having:

a pair of cup elements, the interior of each of said cup elements being hemispherical so that said cup elements joined along their respective circumferential edges results in their interiors together defining a spherical cavity constituting a seating for the ball and having a flared aperture defined by arcuate recesses formed in the circumferential edges of each of said cup elements, said flared aperture having a diameter which increases in the direction from the interior to the exterior of said cup elements, the centers of said flared aperture and spherical cavity defining an axis;

an articulating means hingedly connecting adjoining portions of the circumferential edges of said cup elements together enabling said cup elements to articulate between an open position, wherein said cup elements are swung apart sufficiently to allow insertion of the ball into the interior of said cup elements, and a closed position, wherein said cup elements are swung together to form said ball seating in which the ball is seated so that the adjoining portion of the optical member extends through said flared aperture, said flared aperture enabling the elongate optical element to be adjusted as to its inclination by rotation relative to said spherical cavity center; and a first locking shoulder attached to and projecting outwardly from one of said pair of cup elements adjacent to said circumferential edge of said other one of said cup elements and opposite from said articulating means wherein the pivoting mounting further comprises;

a snap closing element protruding from the other one of said pair of cup elements adjacent to said circumferential edge of said other one of said cup elements and opposite from said articulating means wherein said snap closing element interlocks with said first locking shoulder when said cup elements are in said closed position to hold said cup elements therein; and a mounting means moulded as an integral component of the pivoting mounting connected to at least one of said cup elements, said mounting means enabling attachment of the mounting to the headlamp element allowing articulation of said cup elements when said pivoting mounting is connected to the headlamp element.

12. A pivoting mounting according to claim 11 wherein said articulating means comprises a one-piece film hinge extending between adjoining portions of said respective circumferential edges, said film hinge being integral with said cup elements.

13. A pivoting mounting according to claim 11, and further comprising a centering pin on one of said cup elements and a complementary centering hole on the other of said cup elements, said centering pin and hole being symmetrical about said articulating means so that, with said cup elements joined along said respective circumferential edges, said centering pin is received in said centering hole.

14. A pivoting mounting according to claim 11 wherein:
said mounting means comprises a base member attached to a portion of one of said cup elements, said base member being attached to said cup element on a side thereof that is generally opposite to said flanged aperture, said base member having a flat surface on a side opposite from said one cup element;
snap-fitting means protruding from said flat surface, generally perpendicular thereto;
a mounting window formed in the headlamp element and into which said window snap-fitting means is inserted to be locked thereto enabling said attachment of said pivoting mounting to the headlamp element.

15. A pivoting mounting for attachment to a headlamp element surface and for pivotally supporting an elongate optical element of a vehicle headlamp, an end of the optical element having the shape of a ball, said pivoting mounting comprising:
a pair of cup elements, the interior of each of said cup elements being hemispherical so that said cup elements joined along their respective circumferential edges results in their interiors together defining a spherical cavity constituting a seating for the ball and having a flared aperture defined by arcuate recesses formed in the circumferential edges of each of said cup elements, said flared aperture having a diameter which increases in the direction from the interior to the exterior of said cup elements, the centers of said flared aperture and spherical cavity defining an axis;
an articulating means hingedly connecting adjoining portions of the circumferential edges of said cup elements together enabling said cup elements to articulate between an open position, wherein said cup elements are swung apart sufficiently to allow insertion of the ball into the interior of said cup elements, and a closed position, wherein said cup elements are swung together to form said ball seating in which the ball is seated so that the adjoining portion of the optical member extends through said flared aperture, said flared aperture enabling the elongate optical element to be adjusted as to its inclination by rotation relative to said spherical cavity center;
a first locking shoulder attached to one of said cup elements adjacent to said circumferential edge and opposite from said articulating means;
a snap closing element protruding from the other cup element adjacent to said circumferential edge and opposite from said articulating means wherein said snap closing element interlocks with said first locking shoulder when said cup elements are in said closed position to hold said cup elements therein;
a mounting means connected to at least one of said cup elements, said mounting means enabling attachment of the mounting to the headlamp element allowing articulation of said cup elements when said pivoting mounting is connected to the headlamp element;
said mounting means has a base member attached to a portion of one of said cup elements, said base member being attached to said cup element on a side thereof that is generally opposite to said flanged aperture, said base member having a flat surface on a side opposite from said one cup element;
snap-fitting means protruding from said flat surface, generally perpendicular thereto;
a mounting window formed in the headlamp element and into which said window snap-fitting means is inserted to be locked thereto enabling said attachment of said pivoting mounting to the headlamp element, said mounting window further has a pair of spaced edges, a pair of side-by-side snap-fit catches formed on said snap-fitting means, each of said snap-fit catches having a snap-fit shoulder that extends laterally outwardly from said snap-fitting means and an arm between said shoulder and said flat base member surface wherein the pair of side-by-side arms are spaced apart by a distance slightly smaller than the width of the mounting window spaced edges, the distance between said shoulders being greater than the width of the mounting window spaced edges, said snap-fit catches being resilient to enable insertion of said snap-fit shoulders through the mounting window wherein said snap-fit shoulders extend outwardly thereby obstructing removal of said snap-fit catches from the mounting window.

16. A pivoting mounting according to claim 15 wherein the height of said snap-fit catches is less than the height of said mounting window enabling displacement of said pivoting mounting relative to said mounting window edges of the headlamp element.

17. A pivoting mounting according to claim 11 wherein said pivoting mounting is a one-piece integral member and said mounting means is resilient.

18. A pivoting mounting according to claim 11 wherein said pivoting mounting is plastic.

19. A pivoting mounting according to claim 11 in combination with the optical element of a vehicle headlamp.

* * * * *